United States Patent [19]

Ohmae

[11] Patent Number: 5,355,458
[45] Date of Patent: Oct. 11, 1994

[54] MICROCOMPUTER WITH TABLE ADDRESS FORCING FOR DIFFERENT SIZE MEMORIES

[75] Inventor: Hideo Ohmae, Kobe, Japan

[73] Assignee: Rohm Co., Ltd., Kyoto, Japan

[21] Appl. No.: 774,312

[22] Filed: Oct. 10, 1991

[51] Int. Cl.⁵ .................. G06F 12/02; G06F 13/00
[52] U.S. Cl. .................. 395/375; 364/244.6; 364/255.4; 364/DIG. 1
[58] Field of Search .............. 395/250, 325, 375, 400, 395/425, 500, 600, 700, 775, 800, DIG. 1 MS File, DIG. 2 MS File; 380/4, 5

[56] References Cited

U.S. PATENT DOCUMENTS 4,626,986 12/1986 Mori .............................. 395/700

Primary Examiner—Robert B. Harrell
Attorney, Agent, or Firm—Fay, Sharpe, Beall, Fagan, Minnich & McKee

[57] ABSTRACT

A microcomputer features the provision of wiring connected to a program counter, the wiring being used for setting a bit at a particular digit position of the program counter to a logical value "0" in proportion to the storage capacity of a memory actually packaged, and when an instruction for gaining access to the rearmost storage area of the largest memory that can be packaged is executed, an address space to be accessed then is forced to be converted to the rearmost address space on the memory thus packaged on the program counter by means of the wiring, whereby data in the rearmost storage area of the memory actually packaged may be accessed with the same program. A process of producing the microcomputer comprises at least the step of setting data in a memory simultaneously with the provision of the wiring for the program counter.

24 Claims, 3 Drawing Sheets

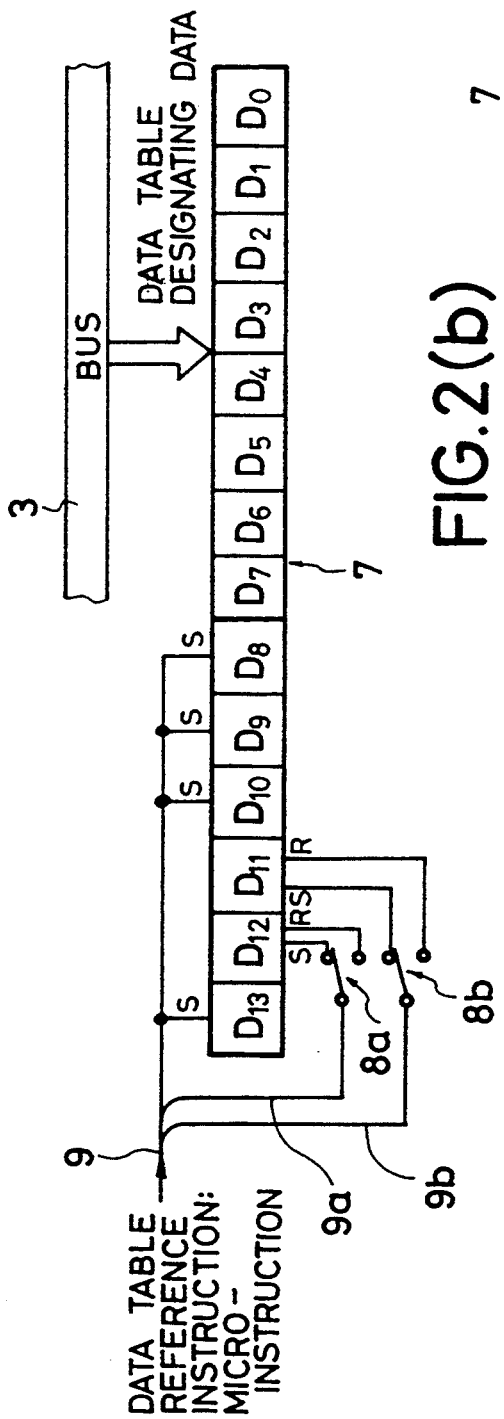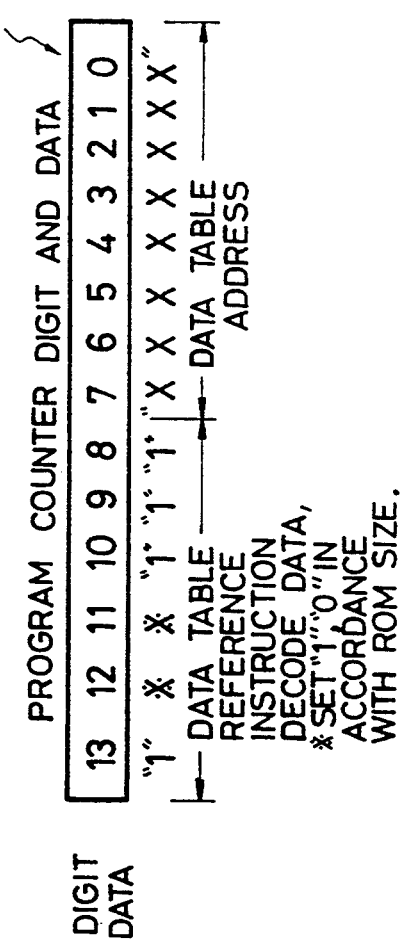

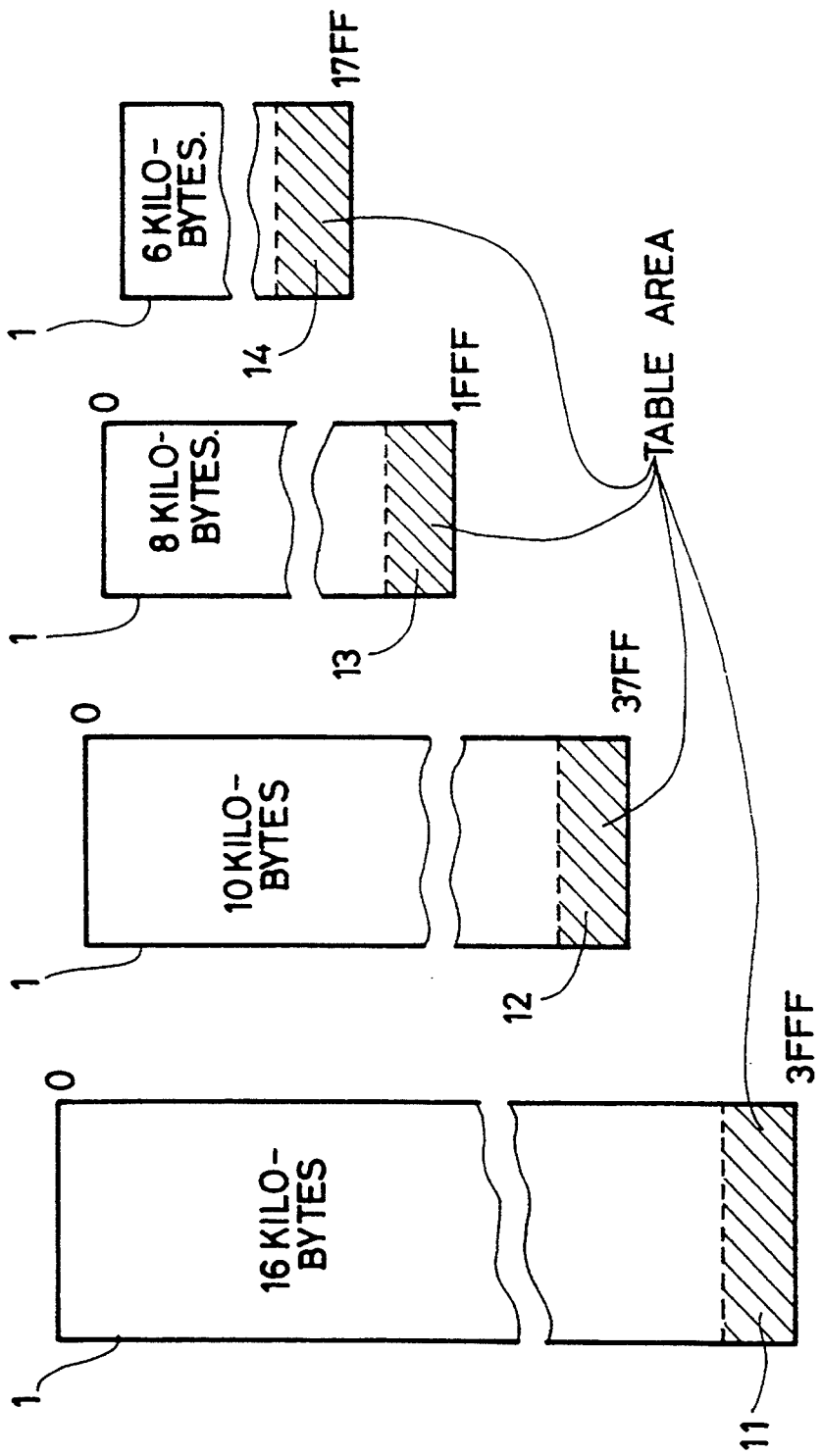

MICROCOMPUTER WITH TABLE ADDRESS FORCING FOR DIFFERENT SIZE MEMORIES

BACKGROUND OF THE INVENTION

1. TECHNICAL FIELD

The present invention relates generally to microcomputers and processes of producing such microcomputers. More particularly, the present invention relates to an ASIC (IC for specific use) type microcomputer for exerting control by reference to a data table (data in the form of a table), the microcomputer being capable of readily setting the position of the data table set on ROM to the rearmost part of the storage area thereof, and a process of producing the same. Further, the present invention relates to a microcomputer capable of having ROM with various storage capacities packaged without changing the contents of microprograms and instructions on reference to the data table, and a process of producing the same.

2. Background Art

Microcomputers in the form of one chip are widely used in control circuits, remote controllers and the like of cameras, home electric appliances and many other kinds of electronic equipment, these being generally under 4- and 8-bit control.

A one-chip microcomputer of the sort described above is slightly different in internal construction from a general purpose microprocessor. The one-chip microcomputer has a number of registers, memories, ALU and the like that have been built in one chip and connected via buses. In this case, an I/O buffer connected to an internal bus is used for exchanging signals with an external device. In other words, such a one-chip microcomputer is designed to exchange data with an external circuit via the I/O buffer by having a controller control circuits including registers, memories, ALU and the like, the controller being CPU, a designated gate circuit, a logic circuit or the like.

In the case of the ASIC microcomputer under the control of a microprogram excluding a full-custom case, the most of control circuits are used commonly as hardware. A microcomputer of this sort is designed to suit ASIC as per specification designated mainly by changing the contents of instructions and constant data. In this case, however, the size of a memory such as ROM for storing instructions and constant data often varies, depending on the specification. Moreover, microprograms as programs to be written to ROM are normally unitized according to the processing function; program units for common use and standardized program units among them are stored preferentially and successively. Subsequently, a necessary data table corresponding to a difference in specification and the subject matter of control is packaged in the rearmost storage area of ROM.

When the storage capacity of ROM (ROM size) for storing a microprogram differs, however, the last address also differs depending on the size. Consequently, the position of the rearmost storage area after a data table is arranged varies with the ROM size. When the size of ROM to be packaged differs, an access address should be altered in proportion to the size of ROM to be packaged or the hardware should be modified with respect to the microprogram referred to by the data table, reference instructions of the data table or the like.

However, alteration of the contents of a program or an instruction affects various other programs. As a result, use may be made of a method of dispensing with such alteration. Hardware is changed in accordance with the ROM size in the preceding case. Otherwise, a special program for converting the access address of the data table in accordance with the ROM size is provided to deal with that case programmatically. Notwithstanding, the storage area of ROM is consumed in the latter case to the extent that the programmatic processing is carried out and moreover the problem is that the sufficient storage area of the data table will not be secured.

SUMMARY OF THE INVENTION

A microcomputer according to the present invention features the provision of wiring connected to a program counter, the wiring being used for setting a bit at a particular digit position of the program counter to a logical value "0" in proportion to the storage capacity of a memory actually packaged, and when an instruction for gaining access to the rearmost storage area of the largest memory that can be packaged is executed, an address space to be accessed then is forced to be converted to the rearmost address space on the memory thus packaged on the program counter by means of the wiring, whereby data in the rearmost storage area of the memory actually packaged may be accessed with the same program.

In a microcomputer of specific construction wherein a memory is accessed according to an address value designated by a program counter to have data read therefrom, wherein the data thus read is decoded when it is an instruction and wherein the ensuing value of the program counter is determined by the decoded result, the program counter has the number of digits with which a memory having a maximum storage capacity as what can be packaged is accessed and an area covering a predetermined storage capacity is secured in the rearmost part of the memory actually packaged: data commonly accessed by various programs and instructions are set in this area; moreover, a program having an instruction for gaining access to data to be disposed in the area covering the storage capacity above in the rearmost part of the memory that can be packaged and has the maximum storage capacity is also stored in this area. To gain access to the area covering the storage capacity in the rearmost part of the memory packaged when the instruction is executed, further, the program counter is provided with wiring for setting a specific bit out of the bits having a logical value "1" set at a plurality of high order digits of the program counter to "0."

The address space accessed as a result of the execution of the instruction is forced to be converted on the program counter to the address space accessed on the memory, so that the rearmost storage area of the memory actually packaged may thus be accessed without alteration of the instruction. A microprogram or an instruction for gaining access to the data disposed in the rearmost part of the memory can be loaded commonly in a memory of different size. No alteration of such a microprogram is required either. As wiring intended for an address counter in this case is concerned with the alteration of setting the logical value about the digit position of the program counter, it may simply be carried out. If, moreover, the wiring for setting the bit of the specific digit position of the address counter is made simultaneously with setting data in the memory packaged during the process of manufacture, wiring may also be simplified. With this arrangement, no alteration including adding and deleting hardware is necessary in particular and a data table area can be secured adequately.

An object of the present invention is therefore to provide a microcomputer dispensing with the alteration of contents of an instruction even though the position of data referred to by the execution of the instruction stored in a memory is set in the rearmost storage area, irrespective of the memory storage capacity.

Another object of the present invention is to provide microcomputer capable of packaging ROM having various different storage capacities without altering the contents of any one of the microprograms, data table reference instructions or the like for use in gaining access to a data table.

Still another object of the present invention is to provide a microcomputer which makes it possible to gain access to the area set in the rearmost part of ROM size by means of a common microprogram or instruction only by selecting wiring during the process of manufacture.

BRIEF DESCRIPTION OF THE DRAWINGS

FIGS. 2(a) and 2(b) are diagrams illustrating the relation between a program counter and an address data for gaining access to a data table that is set therein.

FIG. 3, consisting of FIGS. 3(a), (b), (c), and 3(d) is a diagram illustrating the position of the data table that is set in accordance with the size of ROM for storing the microprogram.

DESCRIPTION OF THE PREFERRED EMBODIMENT

Figure 1:
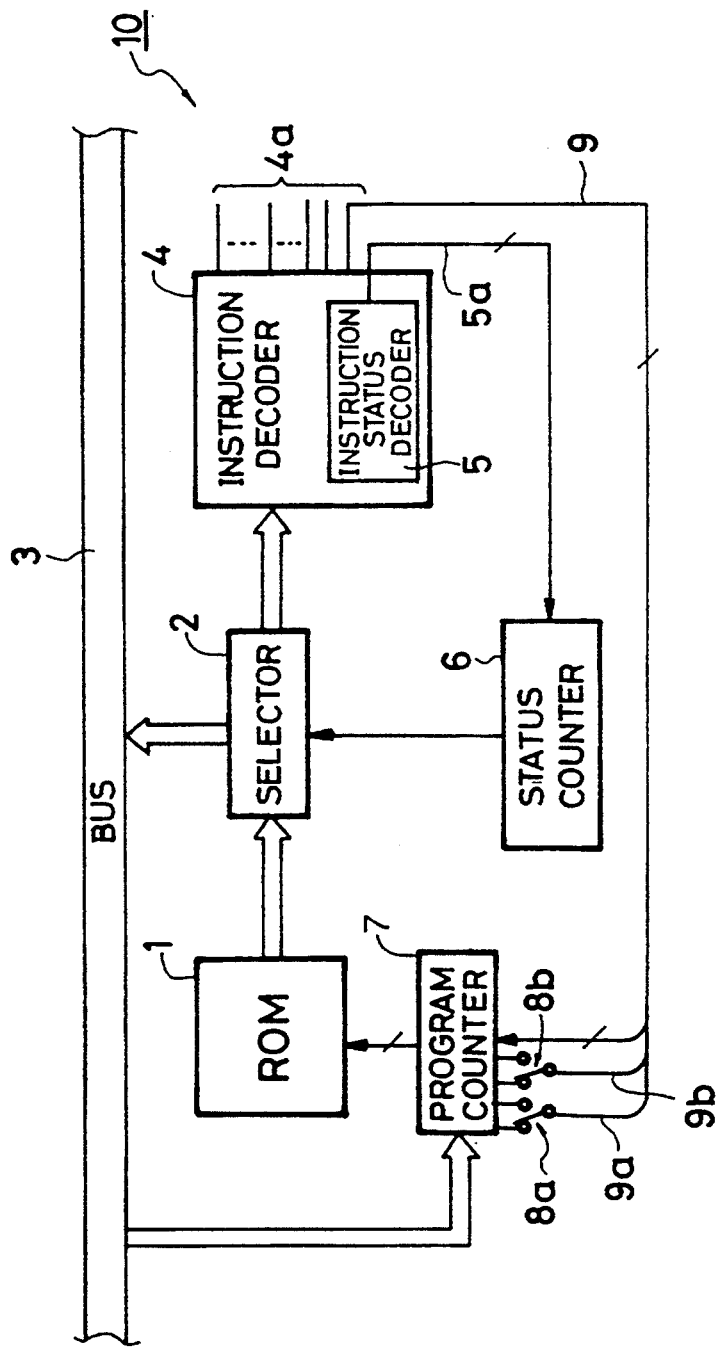
FIG. 1 is a block diagram mainly illustration a control circuit of a microcomputer embodying the present invention.

A control circuit 10 shown in FIG. 1 comprises ROM for storing a so-called microprogram including instructions and constant data, a selector 2 for switching paths in order to supply the data read from ROM 1 to either a bus 3 or an instruction decoder 4.

On receiving an instruction from the selector 2, the instruction decoder 4 decodes the instruction. A signal resulting from decoding the instruction is broadly divided into two: an instruction signal 4a for controlling various internal circuits such as ALU and a signal 9 for feeding data to a program counter 7. The instruction decoder 4 has a built-in instruction status decoder 5. The instruction status decoder 5 decodes the instruction read from ROM 1 via the selector 2 and produces 2-bit discrimination data 5a corresponding to the instruction status; that is, whether it is 1-byte instruction +1-byte constant data or a 2-byte instruction. The discrimination data 5a thus produced is sent to a status counter 6. There are three kinds of discrimination data 5a as described later: "00", "01" and "10" and these data together with the instruction signal 4a are utilized for controlling the status of each circuit and the like.

The status counter 6 stores the discrimination data 5a received from the instruction status decoder 5 as a count value. As the count value changes, the status counter 6 sends to the selector 2 a switching signal intended for the selector 2 and exerts control so as to send the output of ROM 1 to either the instruction decoder 4 or the bus 3.

The program counter 7 receives the signal 9 as part of the instruction signal from the instruction decoder 4, whereby the following read address of ROM 1 is set in the program counter 7.

FIG. 2(a) is a diagram illustrative of the program counter 7. In this case, the maximum value of memory size of ROM 1 that can be packaged is assumed 16 kilo-bytes for simplification of description. Therefore, the program counter 7 is made a counter composed of 14-digit flip-flops so that the whole size range may be accessed.

on receiving the output (signal 9) of the instruction decoder 4, data of high order 6-bit $D_8$–$D_{13}$ out of the 14 digits are set, whereas data of low order 8-bit $D_0$–$D_7$ are received from ROM 1, other registers, ALU, an I/O buffer or the like via the bus 3 before being set.

As a result, a data table 11 to be stored in ROM 1 is allocated to an address space where the data of high order 6-bit $D_8$–$D_{13}$ have a logical value of "1" when ROM 1 is of the 16 KB value as shown in FIG. 3(a). The data of low order 8-bit $D_0$–$D_7$ are used to designate an address area (=256 bytes in this case) of the data table 11. Consequently, the output signal 9 for making all the data of high order 6-bit $D_8$–$D_{13}$ of the program counter 7 to be "1" is fed to the program counter 7 when the instruction decoder 4 decodes a reference instruction and the like for gaining access to the data table during the execution of a certain microprogram (including its program unit).

With respect to high order $D_{11}$ at the 12th digit and high order $D_{12}$ at the 13th digit of the program counter 7 in this case, output signal lines 9a, 9b of the instruction decoder 4 for outputting bits at these digits are selectively connected via selective connection circuits 8a, 8b to a terminal S on the setting side and a terminal R on the resetting side of the flip-flops, respectively. As a result, a logical value "1" or "0" may be set relative to the data at the digit positions of $D_{11}$, $D_{12}$ as shown by * of FIG. 2(b).

The selective connection circuits 8a, 8b are wiring circuits are connected as switching is effected when data is written to ROM. In this embodiment, however, the selective connection circuits are such that the connection of the wiring is simultaneously selected during the process of manufacture where data is written to ROM as described later. When ROM 1 is a programmable ROM, the connection of the wiring is selected for the connection circuits as part of the program.

In a state where both output signal lines 9a, 9b are connected by the selective connection circuits 8a, 8b to the setting side S, the high order 6-bit output "1" of the instruction decoder 4 is set in when the data table reference instruction for gaining access to the data table 11 is decoded, for instance. Therefore, the data table 11 set in the 256 bytes rearmost part of the 16-KB ROM 1 becomes accessible when the microprogram stored then is executed as shown in FIG. 3(a).

While the selective connection circuits 8a, 8b both are connected to the resetting side, $D_{11}$, $D_{12}$ are reset when an output with respect to $D_{11}$, $D_{12}$ of the instruction decoder 4 becomes "1" and the values of $D_{11}$, $D_{12}$ both become "0". Therefore, the address designated by the program counter 7 then is within the range of an address space where high order 6 bits become "100111." Then its final address becomes "27FFF, for FIG. 3(b)." This is a case where a data table 12 set in the rearmost part of 256 bytes of the 16-KB ROM 1 is accessed as shown in FIG. 3(b).

If it is assumed that the microprogram of the same data table reference instruction as what is stored when the 16-KB ROM of FIG. 3(a) is packaged is packaged in ROM 1, the output signal 9 makes the high order 6-bit $D_8$–$D_{13}$ of the program counter 7 totally "1" when the data table reference instruction is decoded after the microprogram is executed. At this time, however, the actual value of the program counter 7 becomes "100111" as far as the high order 6 bits are concerned, with respect to FIG. 3(b). Consequently, the data table 12 is accessible even though the same microprogram as in the case of the 16 KB ROM of FIG. 3(a) thus packaged is executed.

When the selective connection circuit 8a is connected to the resetting side R while the selective connection circuit 8b remains on the setting side S, $D_{12}$ is reset when the output with respect to $D_{12}$ of the instruction decoder 4 becomes "1." Consequently, the value of $D_{12}$ becomes "0." The address designated by the program counter 7 then is thereby within the range of an address space where the high order 6 bits become "101111", whereas the final address becomes "1FFF". This is a case where a data table 13 set in the rearmost part of 256 bytes of the 8-KB ROM 1 is accessed as shown in FIG. 3(c). Moreover, the data table 13 is accessible likewise even though the same microprogram as in the case of the 16 KB ROM of FIG. 3(a) thus packaged is executed.

When the selective connection circuit 8b is connected to the resetting side R while the selective connection circuit 8a remains on the setting side S, $D_{11}$, is reset when the output with respect to $D_{11}$ of the instruction decoder 4 becomes "1." Consequently, the value of $D_{11}$ becomes "0." The address designated then is thereby within the range of an address space where the high order 6 bits become "110111", whereas the final address becomes "17FF". This is a case where a data table 14 set in the rearmost part of 256 bytes of the 6-KB ROM 1 is accessed as shown in FIG. 3(d). Moreover, the data table 14 is accessible likewise even though the same microprogram as in the case of the 16 KB ROM of FIG. 3(a) thus packaged is executed.

In the cases described above, an address space other than what is defined by preceding 256 bytes from the final address may be accessed by data at a resetting digit position up to a position one digit lower. Therefore, other address spaces remain unaffected.

As the predetermined digit position of the address counter 7 is preset by the selective connection circuits 8a, 8b to be "0" in accordance with the size of ROM 1, the data tables 12, 13, 14 with different address spaces being thus allocated may be accessible even though use is made of the microprogram having an instruction such as the data table reference instruction for gaining access to the data table 11 that follows 16 KB. Consequently, no alteration of such a microprogram is required.

With a mask ROM for use as the ROM 1, the selective connection circuits 8a, 8b and ROM data may be formed in the same layer, so that either the terminal S on the setting side or the terminal R on the resetting side is selected simultaneously with data writing before being connected thereto. The selective connection of the selective connection circuits 8a, 8b is thereby facilitated under the optional process of selecting the mask when data is written to ROM during the process of manufacture. For the connection of these circuits, moreover, a hardware circuit accompanied with a special logic circuit or the like can be dispensed with.

The operation of decoding instructions will subsequently be described. First, an instruction is read from a preset address when power is supplied. Data read from an address of ROM 1 is normally an instruction at first. The selector 2 is set on the side of the instruction decoder 4 in the initial state.

On receiving an initial instruction from ROM 1, the instruction decoder 4 decodes an instruction part of the instruction. When the instruction is only a 1-byte instruction, the instruction status decoder 5 sends "00" 2-bit data to the status counter 6 as a value of discrimination data 5a. When the instruction is a 1-byte instruction +1-byte constant, the instruction status decoder 5 sends "01" 2-bit data to the status counter 6 as a value of the discrimination data 5a. When the instruction is a 2-byte instruction, the instruction status decoder 5 sends "10" 2-bit data to the status counter 6 as a value of the discrimination data 5a. The instruction status decoder 5 may be formed with, for instance, ROM which causes addressing to be effected by the contents of an instruction (data in the construction part) corresponding to the instruction status and stores data of "00", "01", "10" in accordance with the instruction status at the position thus addressed.

The status counter 6 receives the discrimination data 5a each time the instruction decoder 4 decodes the instruction and sets the discrimination data 5a in the counter. When the value of the counter is "00", a 1-byte instruction is surmised and the selector 2 is switched to the side of the instruction decoder 4. Consequently, the data read from ROM 1 subsequently is sent by the program counter 7 to the instruction decoder 4. When the counter value is "01", moreover, the selector 2 is switched to the side of the bus 3. The data read from the program counter 7 is thus sent to the bus 3. When the counter value is "10", further, the selector 2 is switched to the side of the instruction decoder 4 and the data from ROM 1 is sent to the side of the instruction decoder 4 as what is under a 2-byte instruction. Control is thus exerted.

When an instruction or a microprogram including the instruction for gaining access to the data table is produced in the instruction decoder 4 during the process described above, the instruction is decoded. As a result, the data for making the high order $D_8$–$D_{13}$ of the program counter 7 "1", is fed to the program counter 7. As set forth above, however, the values of the digits of $D_{11}$, $D_{12}$ of the program counter 7 are set by the selective connection circuits 8a, 8b to be selectively "0" or totally "0" as described in FIG. 2 with respect to any one of the data tables 11, 12, 13 and 14 set in accordance with the size of ROM thus packaged. The program commonly packaged in ROMs different in size as shown in FIGS. 3(a)–(d) is then executed and even though the table reference instruction and the like are consequently decoded, the data table disposed in the space conforming to the ROM size is accessed at this time as is understood from the description given above. Therefore, necessary data is obtainable therefrom.

Although a description has been given of 16 KB as the maximum ROM size in the embodiment shown, this is only an example. In other words, ROM may be of size other than 16 KB. Although reference has been made up to only 6 KB as an example of small ROM size in the embodiment shown, the digit positions where setting and resetting are effected may be extended up to lower order digits. Hence, the present invention is needless to say applicable to ROM having a capacity of 4 KB or smaller.

A memory storing instructions and the like is used as ROM in the embodiment shown. However, the memory may be EPROM, EEPROM, RAM or the like.

We claim:

1. A process of producing a microcomputer wherein a memory is accessed according to an address value designated by a program counter, to have data read therefrom, wherein the data thus read is decoded by a decoder when it is an instruction and wherein an ensuing value of the program counter is determined by a decoded instruction, said process comprising the steps of:

forming the program counter having a number of digits with which a maximum storage capacity that can be packaged as said memory is accessed;

setting the data in an area covering a predetermined storage capacity in a rearmost part of an address space in said memory;

storing a program having the instruction for gaining access to the data in the area; and providing wiring for setting a specific digit out of the digits having a logical value "1" set at a plurality of high order digits of said program counter to "0", to gain access to said area of said memory when the instruction is executed.

2. The process of producing a microcomputer as claimed in claim 1, wherein all of said steps are repeated for a plurality of iterations respectively producing different microcomputers, some of which microcomputers have different maximum storage capacities and a corresponding different plurality of high order digits set to "0" by said step of providing wiring, and so that all of said microcomputers have a common program so that the decoded instruction is the same for all of the microcomputers, whereby different microcomputers with different maximum storage capacity with the area at the rearmost part of accessible by a common instruction of a common program.

3. The process of producing a microcomputer as claimed in claim 2, wherein all of said steps are conducted to produce each of the microcomputers on a single chip respectively.

4. The process of producing a microcomputer as claimed in claim 3, wherein said step of providing wiring provides permanent wiring.

5. The process of producing a microcomputer as claimed in claim 4, wherein all of said steps produce said memory as a ROM.

6. The process of producing a microcomputer as claimed in claim 5, wherein said step of forming the program counter forms a plurality of flip-flops corresponding in number to the number of digits, with at least one of said flip-flops corresponding to the specific digit having set and reset terminals; and wherein said step of providing wiring permanently wires only one of said set and reset terminals of said one flip-flop to a corresponding digit of the decoded instruction.

7. The process of producing a microcomputer as claimed in claim 4, wherein said step of forming the program counter forms a plurality of flip-flops corresponding in number to the number of digits, with at least one of said flip-flops corresponding to the specific digit having set and reset terminals; and wherein said step of providing wiring permanently wires only one of said set and reset terminals of said one flip-flop to a corresponding digit of the decoded instruction.

8. The process of producing a microcomputer as claimed in claim 3, wherein said step of forming the program counter forms a plurality of flip-flops corresponding in number to the number of digits, with at least one of said flip-flops corresponding to the specific digit having set and reset terminals; and wherein said step of providing wiring permanently wires only one of said set and reset terminals of said one flip-flop to a corresponding digit of the decoded instruction.

9. The process of producing a microcomputer as claimed in claim 2, wherein said step of forming the program counter forms a plurality of flip-flops corresponding in number to the number of digits, with at least one of said flip-flops to a corresponding to the specific digit having set and reset terminals; and wherein said step of providing wiring permanently wires only one of said set and reset terminals of said one flip-flop to a corresponding digit of the decoded instruction.

10. A process of producing a microcomputer as claimed in claim 1, further including setting a switch circuit with on/off states as said wiring during the course of said setting the data.

11. A process of producing a microcomputer as claimed in claim 1, including connecting the program counter between the decoder and the memory so that a highest order digit among the high order digits is provided to said memory in accordance with the decoded instruction independently of the wiring.

12. A microcomputer wherein a memory is accessed according to an address value designated by a program counter, to have data read therefrom, wherein the data thus read is decoded by a decoder when the data is an instruction and wherein an ensuing value of the program counter is determined by a decoded instruction, said microcomputer having;

a wiring provided in such a relation as to be connected to said program counter and used for setting a bit at a particular digit position of said program counter to a logical value "0" in accordance with a storage capacity of said memory and when the instruction is for gaining access to a rearmost address space area of a largest memory that can be packaged as the memory, so that the address value on the program counter then is converted to the rearmost address space on said memory thus packaged, whereby data accessible by a program for common use is stored in said rearmost address space.

13. A microcomputer as claimed in claim 12, wherein said program counter is connected between said decoder and said memory so that the decoded instruction determines the value of the highest order digit independently of said wiring.

14. A microcomputer as claimed in claim 12, wherein said program counter is connected between said decoder and said memory so that the decoded instruction determines the value of the highest order digit independently of said wiring.

15. A microcomputer wherein a memory is accessed according to an address value designated by a program counter, to have data read therefrom, wherein the data thus read is decoded by a decoder when it is an instruction and wherein the ensuing value of the program counter is determined by a decoded instruction, said microcomputer having:

said program counter having a number of address digits for accessing a maximum storage capacity that can be packaged as said memory;

an area covering a predetermined storage capacity is secured in a rearmost part of said memory, data being stored in said area, the instruction being stored in a portion of said memory other than said area, said instruction being used for gaining access to said data in said area on said maximum storage capacity; and wiring for setting a logical value "1" at plurality of high order ones of said address digits of said program counter to "0" to gain access to said area of said memory when the instruction is executed.

16. A microcomputer as claimed in claim 15, wherein the data stored in the area of said memory is in the form of a table and wherein said instruction is a data reference instruction for referring to data in the table.

17. A microcomputer as claimed in claim 15, wherein said program counter is connected between said decoder and said memory so that the decoded instruction determines the value of the highest order digit independently of said wiring.

18. A microcomputer wherein a memory is accessed according to an address value designated by a program counter, to have data read therefrom, wherein the data thus read is decoded by a decoder when it is an instruction and wherein the ensuing value of the program counter is determined by a decoded instruction, said microcomputer having:

said program counter has a number of digits with which a maximum storage capacity that can be packaged as said memory is accessed;

selective connection circuits for selectively connecting part of high order digits out of the digits of said program counter as output of said decoder;

an area covering a predetermined storage capacity is secured in the rearmost part of said memory, data accessible by the instruction being stored in said area, said instruction being stored in a part of said memory other than said area, said instruction being used for gaining access to said data in said area; and said selective connection circuits setting a plurality of the high order digits of said program counter to "0", to gain access to said area of said memory when said instruction is executed.

19. A microcomputer as claimed in claim 18, wherein said selective connection circuits are selectively wired with said program counter during the process of manufacture.

20. A microcomputer as claimed in claim 18, wherein said program counter has a flip-flop at each of the digits and wherein said selective connection circuits include wiring for setting said plurality of the high order digits in accordance with the maximum storage capacity of said memory by connecting corresponding ones of said flip-flops on setting or resetting to the decoded instruction of said decoder.

21. A microcomputer having a program counter, a memory, a decoder and selective connection circuits, wherein said memory is accessed according to an address value designated by said program counter, to have data read therefrom, wherein the data thus read is decoded by said decoder when it is the instruction and wherein an ensuing value of said program counter is determined by a decoded instruction, said microcomputer having:

said program counter has a number of digits that can access a maximum storage capacity that can be packaged as said memory, and that are set in accordance with the decoded instruction;

an area covering a predetermined storage capacity is secured in a rearmost part of said memory, common data accessible by the instruction being stored in said area, said instruction being stored in a part of said memory other than said area, said instruction being used for gaining access to said data in said area; and said selective connection circuit setting a specific digit out of the digits having a logical value "1" set at a plurality of high order digits of said program counter to "0", to gain access to said area of said memory when said instruction is executed.

22. A microcomputer as claimed in claim 21, wherein said memory is ROM.

23. A microcomputer as claimed in claim 21, wherein said selective connection circuit are a switch circuit having on/off states of connection to part of said high order digits.

24. A microcomputer as claimed in claim 21, wherein said program counter is connected between said decoder and said memory so that the decoded instruction determines the value of the highest order digit independently of said selective connection circuits.

* * * * *